Figure 1:
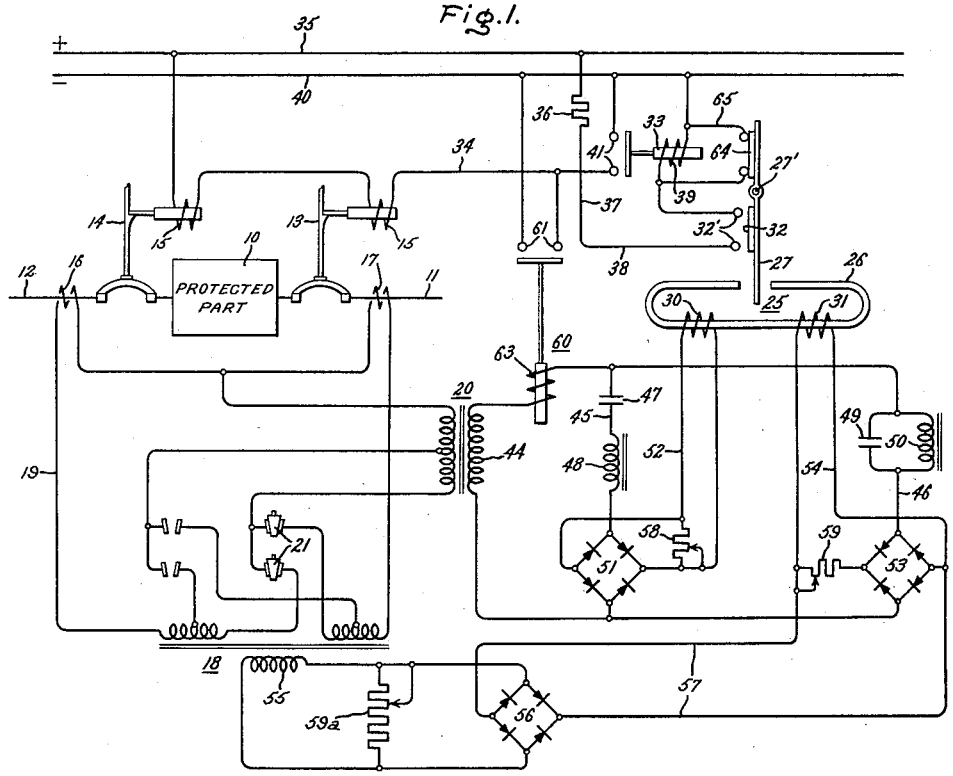

Dec. 2, 1958

N. O. RICE 2,863,100

PROTECTIVE RELAYING EQUIPMENT

Filed Nov. 23, 1955

Inventor:
Neil O. Rice,
by J. Wesley Haulser
His Attorney.

United States Patent Office 2,863,100
Patented Dec. 2, 1958

2,863,100

PROTECTIVE RELAYING EQUIPMENT

Neil O. Rice, Guatemala, Guatemala, assignor to General Electric Company, a corporation of New York Application November 23, 1955, Serial No. 548,791

(Filed under Rule 47(b) and 35 U. S. C. 118)

8 Claims. (Cl. 317—27)

This application is a continuation-in-part of my earlier-filed application, Serial No. 446,326, filed July 28, 1954, now abandoned, and assigned to the same assignee as the present application.

This invention relates to high-speed protective relaying equipment and, more particularly, to high-speed protective relaying equipment which is capable of accurately distinguishing between fault currents and magnetizing inrush currents.

A conventional method of protecting certain types of electrical apparatus against internal faults is by the use of a differential relay operated from differentially connected current transformers located at opposite electrical sides of the apparatus. The performance of such a relay is dependent upon the fact that when an internal fault occurs within the protected apparatus, the currents flowing into the apparatus no longer bear a fixed relationship to the currents flowing out of the apparatus. This condition establishes in the relay circuit a differential current which is effective to operate the relay.

Certain electrical apparatus, such as a power transformer, when energized from a previously deenergized condition, is subjected to high magnetizing-inrush currents. This, of course, is a normal rather than a fault condition and, accordingly, the protective relay should not operate. When used for the protection of such apparatus, the conventional differential relay is subject to false tripping because the inrush current, in effect, flows only into the apparatus and therefore produces a differential operating current in the relay circuit just as does a true internal fault.

One form of protective relay in which false tripping due to magnetizing inrush is prevented depends for its operation upon the difference in wave form between the differential current due to internal faults and that due to magnetizing inrush. The differential current due to magnetizing inrush has a much higher percentage of harmonics than that due to a fault, and this harmonic component of the current is utilized to restrain the operation of the relay during the inrush period. An example of a relay employing such harmonic restraint is described and claimed in Hayward Patent 2,384,375, assigned to the assignee of the present invention.

A disadvantage of a harmonically-restrained relay such as described in the Hayward patent is that heavy internal fault currents flowing into the protected apparatus can produce relay restrain due to the harmonics generated by saturation of the current transformers controlling the protective relay. Obviously, under such fault conditions, it is essential to operate the relay as rapidly as possible rather than to restrain its operation. This is one of the primary problems with which my invention is concerned.

Accordingly, it is an object of my invention to construct harmonically-restrained relay equipment in such a manner that it is capable of high speed operation for substantially all internal fault conditions including those in which the fault current is of sufficient magnitude to generate a large component of harmonic current.

In accordance with one form of my invention, a varying current dependent upon the system current flowing into and out of the protected apparatus is derived from the system and is supplied to a saturable differential current transformer. For magnetizing inrush conditions, this derived current contains a direct current component which acts to saturate the differential current transformer within a predetermined time interval and thereby to cause the transformer to effectively block the flow of the direct current component through its secondary after said predetermined time interval. Connected across the secondary of the current transformer, is the parallel combination of two circuits, one tuned to pass substantially only the fundamental of the derived current and the other tuned to pass the harmonics of the derived current. A pair of oppositely-acting control windings of a first protective relay are respectively connected to be energized in accordance with the currents in said circuits, as a result of which, the operation of this relay is harmonically restrained. A second relay which is unrestrained by harmonics has its coil connected in series with said parallel combination and is arranged to operate in response to overcurrents exceeding a preselected value for a period of time which is greater than the time interval required for the differential current transformer to effectively block said direct current component. This preselected value is of such a magnitude that substantially all fault currents which would have caused false restraint of the harmonically-restrained relay are effective to cause operation of the unrestrained relay.

The reliability of a current transformer-controlled relay depends to a large extent upon the performance of the current transformers controlling the relay. These transformers should not generate such excessive harmonics as would cause false operation or restraint of the relay. Since current transformer performance is determined largely by the burden on the transformer, it is desirable that the burden placed on the transformer by the relay be held to a practical minimum. This burden is dependent upon the energy required to operate the relay which, in turn, is dependent upon the length of the gap between the relay contacts. In general, the shorter this gap, the lower will be the energy required for relay operation and the lower will be the burden on the current transformers. However, the shorter this gap, the more likely it is that the occurrence of transient voltage surges will establish an arc across the relay contacts. Normally, the circuit established by this arc is the same as would be established by the actual closing operation of the relay. As a result, any device which was intended to operate in response to closing operation of the relay would be operated by this contact arcing. This is obviously an undesirable condition which is likely to result in false operation of the relay-controlled device.

Accordingly, it is another object of my invention to provide, in a circuit for controlling a device in response to actual closing operation of a relay, means which precludes control of said device by arcing across the relay contacts and which requires actual closing operation of the relay in order that the relay control the device.

Further objects and advantages of my invention will become apparent as the following description proceeds, and the features of novelty which characterize my invention will be pointed out with particularity in the claims annexed to and forming a part of this specification.

Figure 2:
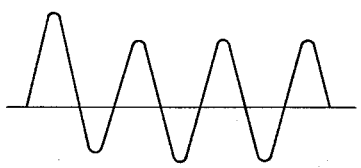
Figure 3:
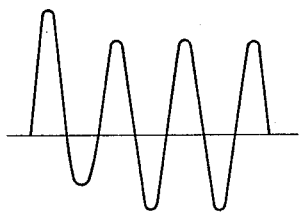
Figure 4:
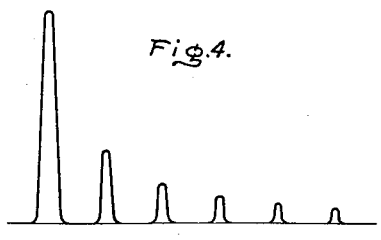
Figure 5:
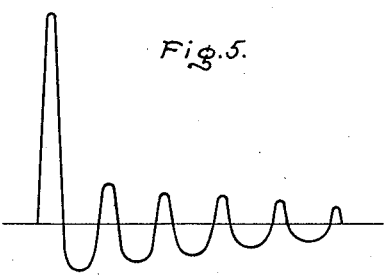

For a better understanding of my invention, reference may be had to the accompanying drawing in which Fig. 1 is a diagrammatic representation of protective relaying equipment constructed in accordance with my invention; Fig. 2 is a typical wave form of a current transformer-derived differential current associated with moderate internal fault currents; Fig. 3 is a typical wave form of differential current associated with heavy internal fault currents; Fig. 4 is a typical wave form of differential current associated with magnetizing-inrush currents; and Fig. 5 is a typical wave form of the secondary current resulting when the primary winding of the differential current transformer of my invention is energized by the current illustrated in Fig. 4.

Referring now to Fig. 1, the electrical apparatus which is to be protected is designated by the numeral 10 and is shown connected in an alternating current circuit comprising power lines 11 and 12. These power lines are respectively connected to the protected apparatus through suitable circuit interrupting means such as the latched-closed, biased-opened circuit breakers 13 and 14. As shown, each of the breakers is provided with a trip coil 15 operable to unlatch the breaker so as to permit opening thereof under the bias of suitable opening springs (not shown). The protected apparatus is designated schematically by a block since it may be any electrical device to which differential protection is applicable. More appropriately, however, the device is a power transformer since it is this type of electrical apparatus which is subject to transient magnetizing-inrush currents of high magnitude. To facilitate an understanding of the invention, only a single phase of the apparatus is shown in conventional one-line form, it being understood that application to the other phases will be, in general, a mere duplication of the arrangement illustrated.

In order to derive the desired differential current, i. e., a current which is dependent on the vector difference between the currents flowing into and out of the apparatus 10 over the circuits 11 and 12 connected thereto, main current transformers 16 and 17 are respectively connected in these circuits. The secondaries of these transformers are connected in series with a through current transformer 18 so as to form a differential circuit, and across this differential circuit a differential current transformer 20 is connected. In a conventional manner which is more fully described in the above-mentioned Hayward patent, the differential current transformer 20 will be energized at all instances in accordance with the sum of the currents flowing through the secondary of the current transformers 16 and 17, which sum is dependent upon the vector difference between the currents flowing into and out of protected apparatus 10. As will soon appear more clearly, the characteristics of this differential current flowing through differential current transformer 20, constitute the criteria for distinguishing between internal faults in the apparatus 10 and other conditions which resemble such faults, but are not.

In order that the differential current flowing through the differential current transformer 20 be substantially zero under normal conditions when the protected apparatus is sound, the through current transformer is provided with suitable adjusting means such as the tap blocks 21 shown. Should the protective device be a current transforming device such as a power transformer, these tap blocks permit adjustment of the through current transformer 18 so that the effective ratio of the main current transformer 16 and 17 substantially matches that of the windings of the power transformer. The through current transformer also is utilized to prevent false relay operation upon the occurrence of heavy through fault current on power lines 11, 12. Such heavy currents tend to saturate the current transformers 16 and 17 and thereby cause their ratio to depart appreciably from its normal value, as a result of which relay operating current tends to flow in the differential current transformer 20. In a known manner which will soon be described in greater detail, relay operation under these conditions is restrained by utilizing the output of the through current transformer to supply a restraining coil for the relay.

With such an arrangement, the relay operating current, which is dependent upon the current flowing through the differential current transformer 20 must exceed a certain percentage of the through current before the relay operates. Relays operating in accordance with this principle are termed percentage differential relays having through current restraint.

Since the characteristics of the differential current flowing through the differential current transformer constitute the criteria for distinguishing between internal faults and other conditions which resemble such faults, but are not, an understanding of my invention may be facilitated by considering these characteristics in greater detail. For most internal faults the wave form of this differential current principally comprises the fundamental of the power system frequency, a variable percentage of direct current, and only a small percentage of harmonics. Such a wave form is illustrated in Fig. 2. For very heavy internal faults, however, the percentage of harmonics is much greater than for the lighter fault currents. A typical wave form for such differential current is shown in Fig. 3. This increased percentage of harmonics is due principally to saturation of the current transformers. For transient magnetizing-inrush currents such as occur when a power transformer is energized from a deenergized condition, the wave form of the differential current consists principally of the fundamental, a high percentage of harmonics, and a high percentage of direct current. Such a wave form is illustrated in Fig. 4. The operation of the relaying equipment in response to these various differential currents will soon be described in greater detail.

Referring again to Fig. 1, I provide a differential relay 25 which is preferably of the highly sensitive polarized type. As schematically illustrated, this relay comprises a generally U-shaped core 26 having spaced portions between which a pivotally mounted polarized armature 27 is movable. The armature, which is pivoted about a suitable shaft 27', is shown in Fig. 1 in its non-operated position. Wound about the core 26 is an operating winding 30 and a restraining winding 31. Energization of the operating winding 30 tends to move the armature into its operated position, i. e., in a direction such that a main contact 32 mounted thereon completes a circuit across a pair of cooperating main contacts 32'. On the other hand, energization of the restraining winding 31 tends to oppose the action of the operating winding 30 and to maintain the armature in the non-operated position shown. The main contacts 32, 32' are preferably connected in an energizing circuit for the coil of an auxiliary relay 33, which, in turn, controls the energization of a trip circuit 34 for the trip coils 15. Thus, when the armature 27 is operated, it completes an auxiliary relay energizing circuit which extends from the plus D. C. bus 35, through a resistor 36, conductors 37 and 38, contacts 32, 32', the coil 39 of auxiliary relay 33, and then to the minus bus 40. Energization of the auxiliary relay through this energized circuit closes its contacts 41 thereby completing the trip circuit 34 to energize and operate the trip coils 15, thus tripping open the protective breakers 13 and 14.

As will soon appear more clearly, the operating coil 30 is energized by the fundamental of the differential current flowing through the differential current transformer 20, whereas the restraining coil 31 is energized by at least one, and preferably all, of the harmonics of this differential current. To this end, the parallel combination of two tuned circuits 45 and 46 is connected across the secondary 44 of the differential current transformer. The operating coil 30 is connected to be energized from the circuit 45 which is tuned to pass substantially only the fundamental current, whereas the restraining coil 31 is connected to be energized from the circuit 46 which is tuned to pass substantially only the harmonic currents. More particularly, the tuned circuit 45 for the operating coil 30 preferably comprises the series combination of a capacitor 47 and an inductance 48 tuned to a series resonant condition so as to have a low impedance to currents of the fundamental frequency but to essentially block currents of the harmonic frequencies. On the other hand, the tuned circuit 46 includes a capacitor 49 and an inductance 50 tuned to a parallel resonant condition so as to block currents of the fundamental frequency but to pass currents of the harmonic frequencies. Fundamental current flowing through the circuit 45 will be fed into a full wave rectifier 51, the rectified output of which will be supplied through a circuit 52, to the operating coil 30, whereas harmonic current fed through the circuit 46 will be supplied to a full wave rectifier 53, the rectified output of which will be supplied to the restraining coil 31 through a circuit 54. The operating effect and the harmonic restraint effect may be respectively adjusted by means of suitable adjustable resistors 58 and 59 respectively connected in circuit with the rectifiers 51 and 53.

The restraining coil 31 is not only energized from the differential current transformer but is also energized from the secondary 55 of the through current transformer 18. Current from this secondary 55 is fed through a full wave rectifier 56, the rectified output of which is supplied through a circuit 57 to the restraining coil 31. Since the current transformer 18 is energized in accordance with the through current flowing through the protected apparatus, the output current of the secondary 55 will be dependent upon this through current, and accordingly, the restraining coil will be energized in accordance with this through current. As previously stated, this through current restraint prevents operation of the relay 55 unless the ratio between the differential current and the through current exceeds a predetermined value. In a known manner, this through current restraint prevents false operation of the relay due to saturation of the main current transformer on heavy through current faults. The through-current restraining effect may be adjusted by means of a suitable adjustable resistor 59a connected in circuit with rectifier 56.

With the foregoing arrangement, it will be obvious that the differential current which results from most internal faults flows principally in the circuit 45 tuned to pass fundamental current. Since such differential current contains only a small percentage of harmonics, only a negligible amount of current will flow in the other tuned circuit 46. Since the operating coil 30 is connected in the principally energized circuit 45, it will be obvious that the desired high speed operation of the relay will be produced by such internal faults. On the other hand, the differential current produced by magnetizing-inrush contains a large percentage of harmonic current. As a result, a relatively large percentage of such differential current will flow in the restraining circuit 46. Under such conditions, the restraining effect produced by such harmonic current will predominate over the operating effect produced by the fundamental portion of the current and accordingly, operation of the relay 25 will be prevented, or restrained, as is desired for magnetizing-inrush conditions. Tests have demonstrated that in order to produce the desired restraint under such inrush conditions, the differential current transformer must be capable of essentially faithfully reproducing at least a certain initial portion of the current derived from the main current transformer 16, 17. This means that at least for a certain initial time interval, the relatively large direct current component which is contained in the differential current resulting from magnetizing-inrush, must be passed through the differential current transformer. This requirement creates a problem which will become apparent from a description of the performance of the relaying equipment during the flow of heavy internal fault currents.

Under such heavy internal fault currents, the current transformers in the differential circuit 19 become saturated by the heavy current flow, as a result of which, sufficient harmonics may be generated to cause false restraint of the harmonically-restrained relay 25. Under such internal fault conditions it is obvious that, rather than being restrained, the relay equipment should operate as rapidly as possible to effect tripping of the protective breakers 13, 14. To insure that the breakers will be tripped at high speed under such internal fault conditions, I have provided a second relay 60 which is not restrained by the harmonic component of the differential current. This relay 60 has contacts 61 which are connected in the trip circuit 34 in series relationship with the trip coils 15 and in parallel relationship with the contacts 41 of the auxiliary relay 33. Thus, operation of the relay 60 to close its contacts 61 produces energization of the trip coils 15 which respond by tripping the breakers 13, 14, as previously described. To insure that the harmonically-unrestrained relay 60 operates at the highest possible speed, in accordance with my invention, the operating or actuating coil 63 of this relay 60 is connected in series with the parallel combination of the tuned circuits 45 and 46 so that the coil receives the total secondary current of the differential current transformer 20. My tests have demonstrated that to connect the coil in the tuned circuit 45 instead of in the location which I have selected undesirably retards the operation of the relay 60 because of the time delay required for build up of the tuned circuit. However, locating the actuating coil 63 in the selected location presents the problem of false operation of the harmonically-unrestrained relay 60 upon the occurrence of magnetizing-inrush currents. This is the case because, as previously described, for at least a certain initial time interval, the wave of the differential current due to magnetizing-inrush, must be essentially faithfully reproduced in the secondary winding 44 so that proper harmonic restraint may be achieved. Since this wave form contains a very high D. C. component, for this initial time interval its effective value would be above the pickup setting needed for proper operation of the harmonically-unrestrained relay 60. Since the relay 60 should remain inactive for magnetizing-inrush, this, of course, presents a problem of false operation of the relay 60 during the magnetizing-inrush period.

This problem has been overcome in accordance with my invention by dimensioning the core of the transformer 20 of such a size that it saturates to effectively block the D. C. component of the differential current within a time interval which is less than is required for pick up of the harmonically-unrestrained relay 60. As a result, the relay 60 remains inactive during magnetizing-inrush, as desired. To illustrate the wave form of the current flowing through the secondary winding 44 during the magnetizing inrush, reference is had to Fig. 5 of the drawing which illustrates a typical wave form for such current. From Fig. 5, it may be seen that during the first half cycle the wave form contains a large D. C. component and is essentially a faithful reproduction of the wave form for the magnetizing-inrush differential current shown in Fig. 4. After this first half cycle, the D. C. component is effectively blocked and the wave becomes generally symmetrical. Thus the relay 60 may be set to have a pick up value considerably less than the maximum crest value of the secondary current flowing during magnetizing-inrush. It will not operate during the time interval that the secondary current exceeds this pick-up value because the current is at this high value for an interval of time less than that required to pick-up the relay. To prevent operation of the relay 60 during the inrush period, it is only necessary that the relay have a pick up value which exceeds the effective, or root mean square, value of the A. C. component of the secondary current during the first few cycles of the inrush period.

Tests have demonstrated that the essentially faithful reproduction required for correct harmonic restraint is required for even less than a half cycle so that, as a result, the core of the differential current transformer may be built to block the D. C. component within a time which may be even less than the first half cycle. Blocking the D. C. component within this very short time, means that the relay 60 can still be a very high speed relay even though the period of time needed for its pickup is required to be longer than that required for the differential current transformer 20 to effectively block the D. C. component.

Another feature of my invention which contributes to reliable relay operation is the low burden which the relay 25 places upon the current transformers. With this burden held to a practical minimum, the current transformers 16, 17 will not generate such excessive harmonics as would cause false operation or restraint of the relay. The magnitude of this burden is largely dependent upon the energy required to operate the relay which, in turn, is dependent upon the length of the gap between the relay contacts 32, 32'. In general, the shorter this gap, the lower will be the burden on the current transformers. It is obvious, however, that the shorter this gap, the greater the danger that transient high voltage surges which occasionally occur across the D. C. supply buses 35, 40 will establish an arc across the contacts 32, 32'. In conventional arrangements, such an arc would complete an energizing circuit for the auxiliary tripping relay 33 in essentially the same manner as if the contacts 32, 32' were actually operated to closed position. As a result, such arcing would cause the auxiliary relay to falsely operate to trip the protective breakers 13, 14.

In relaying equipment constructed in accordance with my invention, it is possible to shorten this gap to any desired value, e. g., 7 mils, without the danger of false operation due to contact arcing. This is made possible by providing the movable armature 27 of the relay 25 with auxiliary contacts 64 which are connected in a disabling circuit 65. This disabling circuit 65 shunts the coil 39 of the auxiliary relay 33 and is connected in series with the main contacts 32, 32'. The upper portion of armature 27 mechanically interconnects the main contact 32 and the auxiliary contact 64 and positions the auxiliary contact in closed position when the main contact is in open position. The auxiliary contact 64 remains in this closed position until the main contact 32 is actually operated toward its closed-circuit position. Thus, so long as the main contacts 32, 32' are open, the auxiliary contacts effectively short circuit, or disable, the operating coil 39 and thereby prevent its effective energization. Only when the main contact 32 is actually operated into closed-circuit position, are the auxiliary contacts 64 opened to remove the short circuit from around the operating coil 39. Only then may the auxiliary relay 33 be operated. Accordingly, it will be apparent that false operation of the auxiliary relay by arcing across the contacts 32, 32' is effectively prevented.

While I have shown and described a particular embodiment of my invention, I do not desire to be limited to the exact arrangement shown, but seek to cover in the appended claims all those modifications that fall within the true spirit and scope of my invention.

What I claim as new and desire to secure by Letters Patent of the United States is:

1. Relaying equipment for protecting apparatus connected in an alternating current power system and subject to inrush currents of a predetermined maximum value, said equipment comprising means for deriving from said system a varying current dependent upon the currents flowing into and out of said apparatus, said varying current containing fundamental, harmonic, and direct current components, a current transformer having a primary connected to be energized by said derived current and operable within a predetermined time interval to effectively block the flow of said direct current component in the current transformer secondary, the parallel combination of two circuits connected across the secondary of the current transformer, the electrical constants of one of said circuits being proportioned to pass substantially only the fundamental of said derived current and the electrical constants of the other of said currents being proportioned to pass the harmonics of said derived current, a first electro-responsive device having a pair of oppositely-acting control windings respectively connected to be energized in accordance with the currents in said circuits, a second electroresponsive device comprising a coil connected to be energized from said secondary and arranged in series circuit relationship with said parallel combination, contact means operable in response to energization of said coil by overcurrents exceeding a preselected value for a period of time which is greater than the time interval required for the differential current transformer to effectively block said direct current component, said preselected value being greater than the effective value of the A. C. component of secondary current which flows during the first few cycles of maximum inrush current.

2. Relaying equipment for protecting apparatus connected in an alternating current power system and subject to inrush currents of a predetermined maximum value, said equipment comprising means for deriving from said system a varying current dependent upon the currents flowing into and out of said apparatus, said varying current containing fundamental, harmonic and direct current components, a current transformer having a primary connected to be energized by said derived current and saturable within a predetermined time interval by said direct current component whereby the flow of the direct current component through the secondary of the current transformer is effectively blocked after said predetermined time interval, the parallel combination of two circuits connected across the secondary of the current transformer, the electrical constants of one of said circuits being proportioned to pass substantially only the fundamental of said derived current and the electrical constants of the other of said currents being proportioned to pass the harmonics of said derived current, a first electroresponsive device having a pair of oppositely-acting control windings respectively connected to be energized in accordance with the currents in said circuits, a second electroresponsive device comprising a coil connected to be energized from said secondary and arranged in series circuit relationship with said parallel combination, contact means operable in response to energization of said coil by over-currents exceeding a preselected value for a period of time which is greater than the time interval required for the differential current transformer to effectively block said direct current component, said predetermined value being greater than the effective value of the A. C. component of secondary current which flows during the first few cycles of maximum inrush current.

3. Relaying equipment for protecting apparatus connected in an alternating current power system and subject to inrush currents of a predetermined maximum value, said equipment comprising means for deriving from said system a varying current dependent upon the currents flowing into and out of said apparatus, said varying current containing fundamental, harmonic, and direct current components, a current transformer connected to be energized by said derived current and saturable within a predetermined time interval to effectively block the flow of said direct current component in the current transformer secondary, the parallel combination of two circuits connected across said secondary, one of said circuits being arranged to pass substantially only the fundamental of the secondary current and the other of said circuits being arranged to pass the harmonics of the secondary current, an electroresponsive device comprising a coil connected to be energized from said secondary and arranged in series circuit relationship with said parallel combination, contact means operable in response to energization of said coil by overcurrents exceeding a preselected value for a period of time which is greater than the time interval required for the current transformer to effectively block said direct current component, said preselected value being greater than the effective value of the A. C. component of secondary current which flows during the first few cycles of maximum inrush current and being less than the maximum crest value of the secondary current resulting from maximum inrush current.

4. In a protective arrangement for an A. C. system which includes apparatus subject to inrush currents of a predetermined maximum value, means for deriving from said system a varying current dependent on the system current, a differential current transformer connected to be energized by said derived current and saturable within a predetermined time interval by the direct current component of said derived current whereby the flow of said latter component through the secondary of said differential current transformer is effectively blocked after said predetermined time interval, the parallel combination of two circuits connected across the secondary of the current transformer, one of said circuits being tuned to pass substantially only the fundamental of the secondary current and the other of said circuits being tuned to pass the harmonics of the secondary current, a first electroresponsive device comprising a pair of oppositely-acting control windings respectively connected to be energized in accordance with the currents in said circuits, a second electroresponsive device comprising a coil connected to be energized from said secondary and arranged in series circuit relationship with said parallel combination, contact means operable in response to energization of said coil by overcurrents exceeding a preselected value for a period of time which is greater than the time interval required for the differential current transformer to effectively block said D. C. component, said preselected value being greater than the effective value of the A. C. component of the secondary current which flows during the first few cycles of maximum inrush current.

5. The combination of claim 4 in which said preselected value is less than the maximum crest value of the secondary current resulting from maximum inrush current.

6. In a control arrangement for an electroresponsive device which is operable to perform a preselected function upon effective energization of an operating part thereof, a control circuit energizable from a predetermined power source to produce effective energization of said operating part, a relay comprising separable main contacts connected in said control circuit and spaced-apart in their open position by a gap that can be broken down by surge voltage occurring across said source, one of said main contacts being movable to a closed position to effect energization of said control circuit, and actuating means independent of the control circuit energization source for effecting circuit-controlling movement of said one main contact, an auxiliary circuit connected in series with said main contacts and containing normally-closed auxiliary contacts which, when closed, render said auxiliary circuit operative to shunt said operating part and thereby to prevent effective energization of said operating part, and means mechanically coupling one of said auxiliary contacts to said one main contact and operable to move said one auxiliary contact to open position in response to closing operation of said one main contact.

7. In a control arrangement for an electroresponsive device which is operable upon energization of an operating part thereof, a control circuit energizable to effect energization of said operating part, a relay separable main contacts connected in said control circuit and spaced apart in their open position by a gap that can be broken down by surge voltage occurring across said main contacts, one of said main contacts being a normally-open contact movable to a closed position to effect energization of said control circuit, a disabling circuit connected in series with said main contacts and shunting said operating part and including a normally-closed auxiliary contact effective in a closed-circuit position to prevent effective energization of said operating part and effective in an open-circuit position to permit energization of said part, and mechanical coupling means interconnecting said one main contact and said auxiliary contact and operable to move said auxiliary contact to its open-circuit position in response to closing operation of said one main contact.

8. In a control arrangement for an electroresponsive device comprising an operating coil energizable to effect operation of said device, a control circuit energizable from a predetermined source to effect energization of said coil, a control relay comprising separable main contacts connected in said control circuit and spaced apart in their open position by a gap that can be broken down by surge voltages occurring across said source, one of said main contacts being movable from an open position to a closed position to effect energization of said control circuit, and actuating means operable independently of the control circuit energization source for effecting circuit-controlling movement of said main contact, disabling means comprising an auxiliary contact effective in a closed-circuit position to disable said electroresponsive device and effective in an open-circuit position to permit energization of said coil, and mechanical coupling means between said movable main contact and said auxiliary contact for positioning said auxiliary contact in closed-circuit position when said movable main contact is in open position and operable to move said auxiliary contact to open-circuit position in response to movement of said movable main contact to closed position.

References Cited in the file of this patent

UNITED STATES PATENTS 2,384,473   Hayward _____ Sept. 4, 1945